Oct. 11, 1966 W. E. WESOLOWSKI 3,277,553
CAPACITOR PROCESS
Filed Dec. 4, 1963
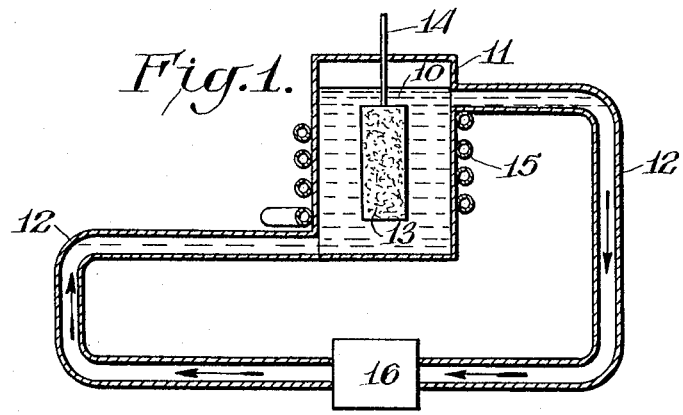
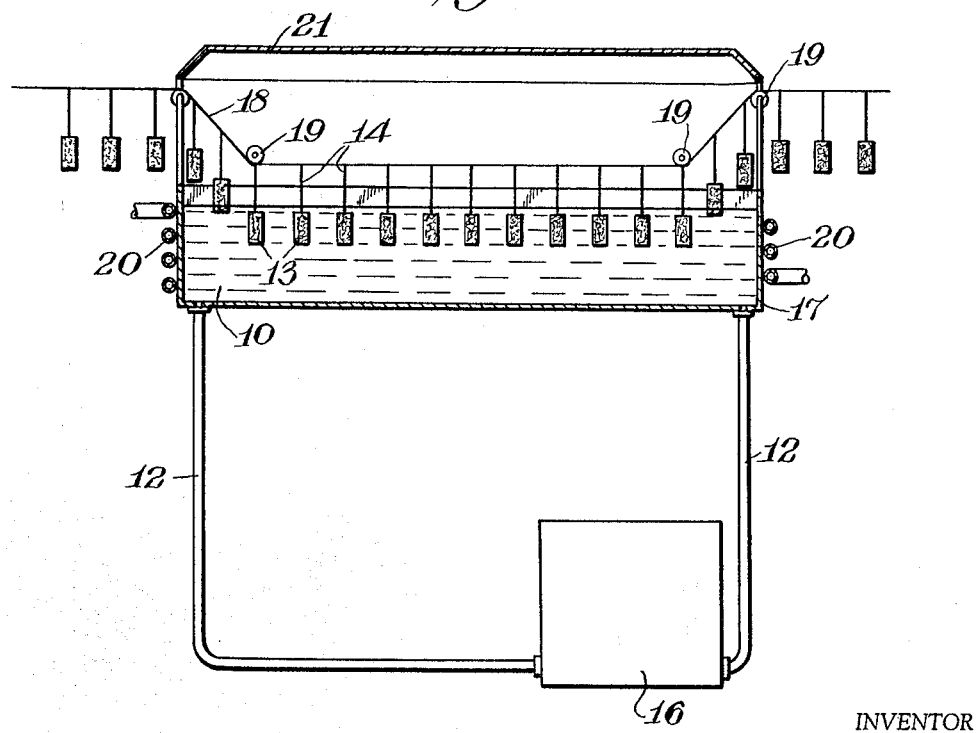
INVENTOR
William E. Wesolowski
BY Connolly and Hutz
ATTORNEYS United States Patent Office 3,277,553
Patented Oct. 11, 1966

3,277,553
CAPACITOR PROCESS
William E. Wesolowski, Adams, Mass., assignor to Sprague Electric Company, North Adams, Mass., a corporation of Massachusetts
Filed Dec. 4, 1963, Ser. No. 328,039
7 Claims. (Cl. 29—25.31)

The present invention relates to so-called solid electrolyte capacitors and more particularly to a process for producing pellet-type solid electrolyte capacitors.

Capacitors of this type comprise a porous, sintered anode, the surfaces of which have a dielectric oxide thereon, a solid electrolyte of semiconducting material in intimate contact with the dielectric and a cathode or counter-electrode in intimate contact with the solid electrolyte. The solid electrolyte is produced in intimate contact with the oxide layer of the sintered pellet by impregnation of this anode body with a solution of a semiconducting oxide precursor, followed by kiln or furnace pyrolysis of the precursor to form the semiconducting oxide.

For reasons not fully understood, the kiln-pyrolysis of the semiconducting oxide precursor results in an outer layer of considerable irregularity and roughness. This layer, which is characterized by asperities, burrs and peaks, varies in overall dimensions from unit to unit. This non-uniformity creates a problem in fitting the units within standard casings and necessitates additional handling to physically abrade or otherwise mechanically size the units to give them a uniform surface of the proper dimensions.

It is, therefore, an object of the instant invention to present a process which overcomes the foregoing problem.

Another object is to provide a process for the production of solid electrolyte capacitors wherein the solid electrolyte layer is reasonably smooth and substantially uniform from unit to unit.

Other objects and advantages of the present invention will be made obvious to those skilled in the art by the following description when considered in relation to the accompanying drawing, of which:

FIGURE 1 is a side view, in section, of a single unit cell for the deposition of a semiconducting oxide according to this invention; and, FIGURE 2 is a side view, in section, of an apparatus used in a continuous process according to this invention.

In general, the present invention provides a process of producing a capacitor comprising impregnating an anodized, porous metal pellet with a solution of a semiconducting oxide precursor, inductively heating said metal pellet to decompose said precursor to the semiconducting oxide and applying an electrically conductive connection to the semiconducting oxide layer.

The principle of inductive heating is well-known and may be briefly defined in the following manner. When an alternating current flows in a conductor, a magnetic field is established around the conductor. By forming a loop or a coil of the conductor the field is intensified. Current will flow in any conductive material placed in this electromagnetic field. The resistance offered by this conductive material to the flow of the induced current produces heat in it proportional to the electrical resistance of the material and to the square of the current flowing. Thus, any metal part placed within a coil energized with alternating electric current heats very rapidly without physical contact between the part and the coil, i.e. it heats by induction.

Applicant has discovered that by placing an anodized, sintered, porous, metal pellet, which has been impregnated with a solution of a semiconducting oxide precursor, within an electromagnetic field of the type described above, the metal pellet, being a susceptor, heats very rapidly by induction. The induced heat decomposes the precursor to the semiconducting oxide, which deposits on the surfaces of the porous pellet.

Unexpectedly the deposited semiconducting layer is exceedingly smooth, continuous and uniform in contrast to the irregular layers formed by furnace or kiln pyrolysis of the precursor.

Referring to FIGURE 1, the present invention is shown as applied to the production of a solid electrolyte tantalum capacitor. A water solution 10 of manganous nitrate is held within a non-susceptible container 11 which has inlet and outlet piping 12. An induction coil 15 surrounds container 11, said coil being connected to a high frequency generator not shown in FIGURE 1. An anodized porous pellet 13 of sintered tantalum particles is immersed within solution 10 by anode lead wire 14. One embodiment of the present invention contemplates a circulation of solution 10 out of container 11 and through unit 16 via piping 12 and return of the same to container 11. Unit 16 contains circulation means, filtering means, temperature control means and concentration monitoring means.

In its simplest form the process operates in the following manner: Pellet 13 is immersed within solution 10 and the solution permitted to thoroughly impregnate said pellet. Coil 15 is energized by a high frequency generator and the pellet is inductively heated in situ. The heat of the pellet decomposes the manganous nitrate within the interstices of the porous pellet and also that which is in association with the outer surfaces of the pellet. The result is a continuous, uniform and comparatively smooth layer of manganese oxide formed on the tantalum oxide surfaces of the tantalum pellet. In this embodiment the solution 10 is not recirculated through unit 16.

In a modification of this process solution 10 is circulated through unit 16 by means of a pump located therein and then returned to container 11. This circulation tends to eliminate localized differences in the concentration of the solution and permits the concentration to be monitored in unit 16, e.g. by specific gravity checks. Unit 16 also contains a filter and temperature control means for either heating or cooling solution 10. Lower temperatures, lower coil current and a comparatively rapid solution circulation appear to favor deposition within the interior of the pellets. Higher temperatures, higher coil current and a comparatively slow solution circulation appear to favor deposition on the exterior surfaces of the pellet.

In a further modification of the foregoing process variations, the inductive heating may be interrupted at given intervals of time, to permit the generated gases to be cleared from the internal and external surfaces of the porous pellet and to permit reimpregnation of the pellet with precursor solution.

The present invention can be adapted to a continuous process as shown in FIGURE 2 wherein: a non-susceptible tank 17 contains a water solution 10 of manganous nitrate; unit 16 contains circulating means, filtering means, temperature control means and concentration monitoring means; piping 12 connects tank 17 with unit 16; a traveling conveyor 18, to which pellets 13 are attached by means of lead wires 14, transports, via pulley wheels 19, said pellets into the tank through the solution and out other end of the tank; an induction coil 20, which is connected to a high frequency generator (not shown) encircles tank 17; a hood 21 is designed to draw off the gases generated during the decomposition of the nitrate.

The continuous process operates in the following manner: the anodized tantalum pellets 13, which may or may not be pre-impregnated with a manganous nitrate solution, are conveyed through the nitrate solution in the tank; while passing through said solution, coil 20 is energized and the tantalum pellets, acting as susceptors, are inductively heated in situ; the heat of the pellets decomposes the manganous nitrate to manganese oxide within the pores of the pellets and the oxide deposits on the internal and external surfaces of the pellets.

After the nitrate has been decomposed in any of the foregoing embodiments, an electrically conductive connection is appled to the manganese oxide layer. A convenient connection is a graphite layer, applied as a volatile liquid dispersion of the same, and after this layer is dried a conductive paint, e.g. silver, is applied to the graphite layer. The units are then ready for encapsulating or mounting in a container, such as, a tinned brass can.

Prior to the application of the conductive connection, which is sometimes referred to as the counterelectrode, it is preferred to subject the units to an electrolytic reformation step. This step, which is more or less common practice in the art, is designed to anodically heal any imperfections developed in the tantalum oxide layer during pyrolysis of the manganese oxide precursor. The reformation step reduces the leakage current to a point of usefulness for the capacitor. The reformation can be conveniently carried out in an aqueous electrolyte under conditions well-known to the art. Suitable reformation electrolytes include, ammonium chloride, boric acid, nitric acid, etc.

A still further modification of the present invention involves what will be termed the "dip-fire" technique. This method differs from the previously described processes in that the induction pyrolysis is not carried out in situ. The following is an example of this technique.

EXAMPLE

Three anodized tantalum pellets were impregnated with a 50% aqueous solution of manganous nitrate (specific gravity about 1.5). They were then rinsed with water to remove excess solution from the external surface of the pellets. One of the pellets was then placed within a 0.750 inch I.D. (1/8" dia. copper tubing), 5 turn coil, with 1 inch leads connected to a 450 kc. induction generator. The coil was then energized at 450 kc. for a firing time of 14 seconds. During the 14 seconds, brown fumes of $NO_2$ were emitted from the pellet. The pellet was removed and reimpregnated with nitrate solution. The following firing sequence, with a reimpregnation and rinse in between each induction period, was performed: 14, 14, 14, 13, 12, 11, 10 and 10 seconds. This was repeated for the other two pellets. At the completion of the process the manganese oxide coating was observed to be smooth, hard and continuous. The units were reformed and an electrical connection of graphite under silver was applied. The following data shows that the units are more than acceptable.

| Unit | Capacitance ($\mu f.$) | R x C (ohms-$\mu f.$) | $I_1$ (leakage current at 50 v.) ($\mu a.$) |
|---|---|---|---|
| 1 | 11.72 | 37 | 0.056 |
| 2 | 11.32 | 39 | 1.8 |
| 3 | 11.58 | 39 | 0.75 |

Although the foregoing example shows some nine induction heating steps, it is understood that even a single induction heating step results in an operable capacitor.

Applicant has also found that certain beneficial results are obtained even if only one of the pyrolysis steps is an induction pyrolysis step. In a process employing two or more pyrolysis steps all except one of the decomposition steps may be by conventional kiln or furnace pyrolysis. Furthermore, benefit is gained regardless of the order of induction and kiln or furnace pyrolysis. It has further been determined that certain control conditions can be achieved by performing some of the pyrolysis steps by the "dip-fire" technique and some by the in situ induction pyrolysis technique.

The anodizable metal contemplated herein is selected from the group consisting of aluminum, beryllium, niobium, hafnium, tantalum, titanium, tungsten and zirconium. The formation electrolytes may be any of the prior art electrolytes, which will effectively yield an oxide surface on the anode, e.g. ammonium chloride, -nitrite, -acetate, -formate, fused sodium nitrate-sodium nitrite, phosphoric acid, etc.

By semiconducting oxide precursor, as used herein, is meant any material which is decomposable to the semiconducting oxide. For example, manganous nitrate is decomposable to manganese dioxide or a mixture of manganese oxides having a substantial proportion of the dioxide. Examples of other manganese dioxide precursors are manganous oxalate, -formate, -acetate, etc. Lead oxide, another semiconducting oxide, can be formed by decomposing appropriate precursors.

As is evident from the foregoing the invention is not to be limited to the rather specific illustrative process. Modifications and variations as well as the substitution of equivalents may be made without departing from the spirit of the invention as defined in the appended claims.

What is claimed is:
1. The process of producing a capacitor body comprising immersing an anodized porous metal pellet in a solution of a semiconducting oxide precursor, impregnating said anodized porous metal pellet with said solution of a semiconducting oxide precursor, inductively heating said metal pellet immersed in said solution so as to decompose said precursor to the semiconducting oxide and applying an electrically conductive connection to said semiconducting oxide.

2. The process of producing a capacitor body comprising immersing an anodized porous tantalum pellet in a solution of a manganese oxide precursor, impregnating said anodized porous tantalum pellet with said solution of manganese oxide precursor, inductively heating said tantalum pellet immersed in said solution so as to decompose said precursor to manganese oxide and applying an electrically conductive connection to said manganese oxide.

3. The process of producing a capacitor comprising:
 (a) immersing an anodized porous tantalum pellet into a solution of a manganese oxide precursor;
 (b) inductively heating said pellet in situ to decompose said precursor to manganese oxide;
 (c) electrolytically reforming the anodic tantalum oxide coating; and
 (d) applying an electrically conductive connection to the manganese oxide layer.

4. The process of claim 3 wherein the inductive heating is interrupted at given intervals of time to permit the generated gases to be cleared from the interstices and surfaces of the porous pellet and the reimpregnation of the same with precursor solution.

5. The process of producing a capacitor comprising:
 (a) immersing an anodized porous tantalum pellet into a solution of a manganese oxide precursor;
 (b) circulating said solution through a filter means, a temperature control means and a concentration monitoring means;
 (c) inductively heating said pellet in situ to decompose said precursor to manganese oxide;
 (d) electrolytically reforming the anodic tantalum oxide coating; and
 (e) applying an electrically conductive connection to the manganese oxide layer.

6. The process of producing a capacitor comprising:
 (a) immersing an anodized porous tantalum pellet into a solution of a manganese oxide precursor;
 (b) circulating said solution through a filtering means, a temperature control means and a concentration monitoring means;
 (c) inductively heating said pellet in situ to decompose said precursor to manganese oxide at spaced intervals of time, said intervals calculated to permit gas clearing from said porous pellet and reimpregnation of the same with precursor solution;
(d) electrolytically reforming the anodic tantalum oxide coating; and
(e) applying an electrically conductive connection to the manganese oxide layer.

7. The process of producing a capacitor body comprising:
(a) immersing an anodized porous metal pellet into a solution of a semiconducting oxide precursor;
(b) impregnating said anodized porous metal pellet with said solution of semiconducting oxide precursor;
(c) inductively heating said pellet in situ to decompose said precursor to the semiconducting oxide;
(d) removing said pellets from said solution and electrolytically reforming the anodic tantalum oxide coating;
(e) repeating steps (a) through (d) at least once; and
(f) applying an electrically conductive connection to the manganese oxide layer.

References Cited by the Examiner

UNITED STATES PATENTS

| | | | |
|---|---|---|---|
| 3,093,883 | 6/1963 | Haring | 29—25.42 |
| 3,100,329 | 8/1963 | Sherman | 29—25.31 |
| 3,122,450 | 2/1964 | Barnes | 29—25.42 X |

JOHN F. CAMPBELL, *Primary Examiner.*

WHITMORE A. WILTZ, *Examiner.*

W. I. BROOKS, *Assistant Examiner.*